US 9,047,472 B2

(12) United States Patent
Riordan et al.

(10) Patent No.: US 9,047,472 B2
(45) Date of Patent: Jun. 2, 2015

(54) MANAGING SENSITIVE CONTENT

(71) Applicant: INTERNATIONAL BUSINESS MACHINES CORPORATION, Armonk, NY (US)

(72) Inventors: James C. Riordan, Raleigh, NC (US); Jack W. Szeto, Durham, NC (US); Ramratan Vennam, Colfax, NC (US); Patrick W. Wolf, Cary, NC (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 13/740,720

(22) Filed: Jan. 14, 2013

(65) Prior Publication Data
US 2014/0201805 A1 Jul. 17, 2014

(51) Int. Cl.
*H04L 29/06* (2006.01)
*G06F 21/60* (2013.01)
*G06F 21/84* (2013.01)

(52) U.S. Cl.
CPC .............. *G06F 21/60* (2013.01); *G06F 21/84* (2013.01); *G06F 2221/032* (2013.01)

(58) Field of Classification Search
CPC .......... G06F 3/01; G06F 3/005; G06F 3/013; G06F 3/033; G06F 1/3215; G06F 1/3218; G06F 1/3231; G06F 11/3051; G06F 11/3055; G06F 11/2247; G06F 3/0013; G06F 21/84
USPC ............................................ 726/1, 26, 28, 34
See application file for complete search history.

(56) References Cited

U.S. PATENT DOCUMENTS

| | | | | |
|---|---|---|---|---|
| 5,793,952 A | | 8/1998 | Limsico | |
| 5,801,697 A | | 9/1998 | Parikh et al. | |
| 6,002,427 A | * | 12/1999 | Kipust | 348/156 |
| 6,111,517 A | * | 8/2000 | Atick et al. | 340/5.83 |
| 6,570,610 B1 | * | 5/2003 | Kipust | 348/156 |
| 7,437,765 B2 | * | 10/2008 | Elms et al. | 726/26 |
| 7,602,382 B2 | | 10/2009 | Hinckley et al. | |
| 2002/0056046 A1 | * | 5/2002 | Klein | 713/200 |
| 2002/0095222 A1 | * | 7/2002 | Lignoul | 700/13 |
| 2002/0099960 A1 | * | 7/2002 | Klein | 713/202 |
| 2003/0196108 A1 | * | 10/2003 | Kung | 713/200 |
| 2004/0015729 A1 | * | 1/2004 | Elms et al. | 713/201 |
| 2004/0193910 A1 | | 9/2004 | Moles | |

(Continued)

OTHER PUBLICATIONS

Majumder, Contrast Enhancement of Multi-Displays Using Human Contrast Sensitivity, Jun. 2005, IEEE, pp. 1-6.*
Dai et al, Making Any Planar Surface into a Touch-sensitive Display by a Mere Projector and Camera, 2012, IEEE, pp. 35-42.*

(Continued)

*Primary Examiner* — Christopher Brown
*Assistant Examiner* — Jenise Jackson
(74) *Attorney, Agent, or Firm* — Paul S. Drake

(57) ABSTRACT

A method, system or computer usable program product for automatically removing sensitive content from a display responsive to removal of user physical proximity from a computer peripheral including utilizing a predefined policy stored in persistent memory for monitoring user interaction with a computer peripheral for a criterion, wherein the criterion is a removal of user contact with the computer peripheral, and responsive to detecting the criterion with a processor, performing a removal action related to displaying sensitive content according to the predefined policy.

19 Claims, 9 Drawing Sheets

*400*

| 410 | 415 | 420 | 425 | 430 | 435 | 440 |
|---|---|---|---|---|---|---|
| Mode | Rank | Event1 | Action1 | Event2 | Action2 | Status |
| Work | High | Look Away | Min. Window | Look at | Max. Window | Clear |
| Work | Medium | Contact Break | Min. Window | Contact | Max. Window | Clear |
| Work | Low | Contact Break2 | Lock System | Password Entry | Unlock System | Clear |
| Home | High | Look Away | Min. Window | User Select | Max. Window | Clear |
| Home | Medium | Contact Break | Min. Window | Contact | Max. Window | Clear |
| Home | Low | Contact Break2 | Lock System | Password Entry | Unlock System | Clear |
| Public | High | Look Away | Min. Window | User Select | Max. Window | Clear |
| Public | Medium | Contact Break | Min. Window | User Select | Max. Window | Clear |
| Public | Low | Contact Break2 | Lock System | Password Entry | Unlock System | Clear |

(56) References Cited

U.S. PATENT DOCUMENTS

| | | | |
|---|---|---|---|
| 2005/0259845 A1* | 11/2005 | Dehlin et al. | 382/103 |
| 2007/0006316 A1 | 1/2007 | Veselova et al. | |
| 2008/0174427 A1* | 7/2008 | Banerjee et al. | 340/541 |
| 2008/0222573 A1* | 9/2008 | Abeckaser | 715/856 |
| 2010/0205667 A1* | 8/2010 | Anderson et al. | 726/19 |
| 2010/0266162 A1* | 10/2010 | Singh et al. | 382/103 |
| 2011/0107958 A1 | 5/2011 | Pance et al. | |
| 2011/0179366 A1* | 7/2011 | Chae | 715/764 |
| 2011/0321143 A1* | 12/2011 | Angaluri et al. | 726/6 |
| 2013/0279744 A1* | 10/2013 | Ingrassia et al. | 382/103 |
| 2013/0307870 A1* | 11/2013 | Ashbrook | 345/629 |
| 2014/0078164 A1* | 3/2014 | Chan et al. | 345/589 |
| 2014/0150114 A1* | 5/2014 | Sinha et al. | 726/28 |
| 2014/0164940 A1* | 6/2014 | Fisher | 715/741 |
| 2014/0172557 A1* | 6/2014 | Eden et al. | 705/14.49 |
| 2014/0245190 A1* | 8/2014 | Bragdon et al. | 715/753 |

OTHER PUBLICATIONS

"Computer Physical Security System—Memory Component Erasure/Damage Device", IP.com, Feb. 1, 1989, IP.com No. IPCOM000034380D, published on the world wide web at: http://ip.com/IPCOM/000034380.

"Personal Computer Module Assembly Physical Security—Embedded—Circuit Switch", IP.com, Sep. 1, 1989, IP.com No. IPCOM000036113D, published on the world wide web at: http://ip.com/IPCOM/000036113.

"Integrated Eye Control in Consumer Computers", Tobii.com, Jul. 16, 2011, published on the world wide web at http://web.archive.org/web/20110716103714/http://www.tobii.com/eye-tracking-integration/global/industry-applications/consumer-computers/.

"Find Out How—Quickly Activate Your Screensaver", Apple.com, 2012, found on the world wide web at: https://www.apple.com/findouthow/mac/#quickscreensaver.

\* cited by examiner

| Mode | Rank | Event1 | Action1 | Event2 | Action2 | Status |
|------|------|--------|---------|--------|---------|--------|
| Work | High | Look Away | Min. Window | Look at | Max. Window | Clear |
| Work | Medium | Contact Break | Min. Window | Contact | Max. Window | Clear |
| Work | Low | Contact Break2 | Lock System | Password Entry | Unlock System | Clear |
| Home | High | Look Away | Min. Window | User Select | Max. Window | Clear |
| Home | Medium | Contact Break | Min. Window | Contact | Max. Window | Clear |
| Home | Low | Contact Break2 | Lock System | Password Entry | Unlock System | Clear |
| Public | High | Look Away | Min. Window | User Select | Max. Window | Clear |
| Public | Medium | Contact Break | Min. Window | User Select | Max. Window | Clear |
| Public | Low | Contact Break2 | Lock System | Password Entry | Unlock System | Clear |

410 Mode, 415 Rank, 420 Event1, 425 Action1, 430 Event2, 435 Action2, 440 Status

| Item | Rank |
|------|------|
| System | Low |
| App1 | Medium |
| App2 | Medium |
| Doc1 | High |
| Doc2 | Low |

460 Item, 470 Rank

FIG. 7A

| 710 Client | 715 Rank | 720 Event1 | 725 Action1 | 730 Event2 | 735 Action2 |
|---|---|---|---|---|---|
| Client1 | High | Contact Break | Min. Window | User Select | Max. Window |
| Client1 | Low | Contact Break2 | Min. Window | Contact | Max. Window |
| Client2 | High | Look Away | Min. Window | Password Entry | Max. Window |
| Client2 | Low | Contact Break | Min. Window | Contact | Max. Window |

| 760 Item | 770 Rank | 780 Status |
|---|---|---|
| System | Low | Clear |
| App1 | Low | Posted |
| Doc1 | High | Clear |

- 910 — Item: [_____]
- 920 — Client: [_____]

- 930 — ☐ New Entry   ☐ Update Entry   ☐ Delete Entry

- 940 — Mode:   ☐ Work   ☐ Home   ☐ Public
- 945 — Rank:   ☐ Low    ☐ Medium ☐ High

- 950 — Event1: [_____]
- 955 — Action1: [_____]
- 960 — Event2: [_____]
- 965 — Action2: [_____]

970 [Apply]

MANAGING SENSITIVE CONTENT

BACKGROUND

1. Technical Field

The present invention relates generally to managing sensitive content, and in particular, to a computer implemented method for managing displayed content based on a predefined policy.

2. Description of Related Art

Whether in a work environment, a home environment, or a public environment, users may work on a variety of displayed content, some of which may be sensitive such as confidential information. As a result, a user may only work on certain applications with sensitive content when no other persons are nearby. The user may also utilize various mechanical or display surface optical devices to limit the ability of others to views the user's display from an angle, particularly in a crowded environment such as a cubical environment or on public transportation. In addition, the user may manually minimize or close windows containing sensitive information when others approach. Furthermore, when a uses leaves the display system, the user may manually lock the system in a mode where a screen saver is displayed instead of content. The mode may require the entry of a user password to unlock the system, thereby maintaining the privacy of the displayed content when the user is not present.

SUMMARY

The illustrative embodiments provide a method, system, and computer usable program product for automatically removing sensitive content from a display responsive to removal of user physical proximity from a computer peripheral including utilizing a predefined policy stored in persistent memory for monitoring user interaction with a computer peripheral for a criterion, wherein the criterion is a removal of user contact with the computer peripheral, and responsive to detecting the criterion with a processor, performing removal action related to displaying sensitive content according to the predefined policy.

BRIEF DESCRIPTION OF THE SEVERAL VIEWS OF THE DRAWINGS

The novel features believed characteristic of the invention are set forth in the appended claims. The invention itself, further objectives and advantages thereof, as well as a preferred mode of use, will best be understood by reference to the following detailed description of illustrative embodiments when read in conjunction with the accompanying drawings, wherein:

FIGS. 4A and 4B are block diagrams of a policy database in accordance with the first embodiment;

FIGS. 7A and 7B are block diagrams of a policy database in accordance with the second embodiment;

FIG. 9 is a diagram of a user interface for establishing a policy database entry in which various embodiments may be implemented.

DETAILED DESCRIPTION

Processes and devices may be implemented and utilized to manage displayed content based on a predefined policy. These processes and apparatuses may be implemented and utilized as will be explained with reference to the various embodiments below.

Figure 1:
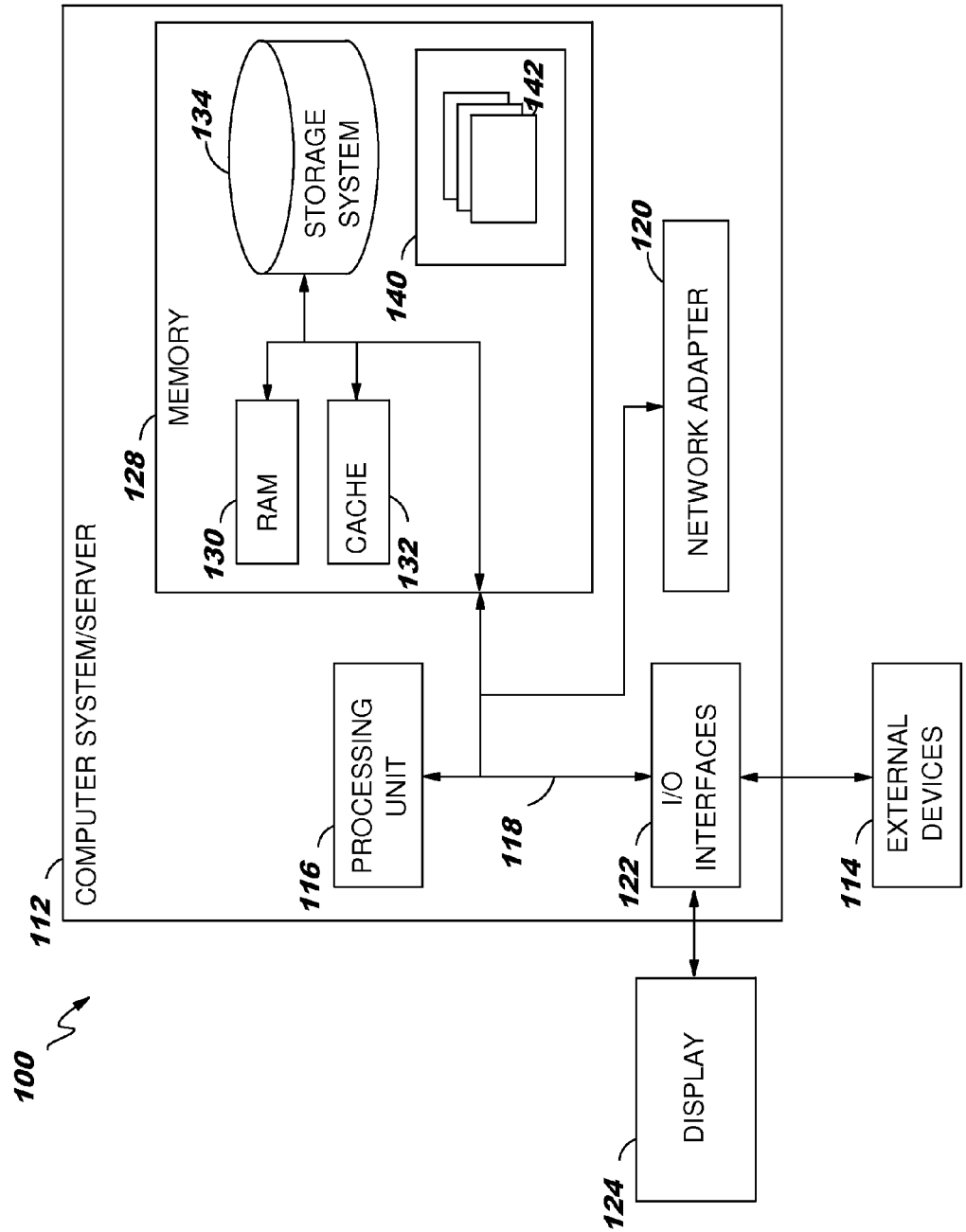
FIG. 1 is a block diagram of a data processing system in which various embodiments may be implemented.

FIG. 1 is a block diagram of a data processing system in which various embodiments may be implemented. Data processing system 100 is one example of a suitable data processing system and is not intended to suggest any limitation as to the scope of use or functionality of embodiments of the invention described herein. Regardless, data processing system 100 is capable of being implemented and/or performing any of the functionality set forth herein.

In data processing system 100 there is a computer system/server 112, which is operational with numerous other general purpose or special purpose computing system environments, peripherals, or configurations. Examples of well-known computing systems, environments, and/or configurations that may be suitable for use with computer system/server 112 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 112 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 112 may be practiced in distributed computing environments where tasks are performed by remote processing devices that are linked through a communications network. In a distributed computing environment, program modules may be located in both local and remote computer system storage media including memory storage devices.

As shown in FIG. 1, computer system/server 112 in data processing system 100 is shown in the form of a general-purpose computing device. The components of computer system/server 112 may include, but are not limited to, one or more processors or processing units 116, a system memory 128, and a bus 118 that couples various system components including system memory 128 to processor 116.

Bus 118 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 112 typically includes a variety of computer system readable media. Such media may be any available media that is accessible by computer system/server 112, and it includes both volatile and non-volatile media, removable and non-removable media.

System memory 128 can include computer system readable media in the form of volatile memory, such as random access memory (RAM) 130 and/or cache memory 132. Computer system/server 112 may further include other removable/non-removable, volatile/non-volatile computer system storage media. By way of example, storage system 134 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 118 by one or more data media interfaces. Memory 128 may include at least one program product having a set (e.g., at least one) of program modules that are configured to carry out the functions of embodiments of the invention. Memory 128 may also include data that will be processed by a program product.

Program/utility 140, having a set (at least one) of program modules 142, may be stored in memory 128 by way of example, and not limitation, as well as an operating system, one or more application programs, other program modules, and program data. Each of the operating system, one or more application programs, other program modules, and program data or some combination thereof, may include an implementation of a networking environment. Program modules 142 generally carry out the functions and/or methodologies of embodiments of the invention. For example, a program module may be software for managing displayed content based on a predefined policy.

Computer system/server 112 may also communicate with one or more external devices 114 such as a keyboard, a pointing device, a display 124, etc.; one or more devices that enable a user to interact with computer system/server 112; and/or any devices (e.g., network card, modem, etc.) that enable computer system/server 112 to communicate with one or more other computing devices. Such communication can occur via I/O interfaces 122 through wired connections or wireless connections. Still yet, computer system/server 112 can communicate with one or more networks such as a local area network (LAN), a general wide area network (WAN), and/or a public network (e.g., the Internet) via network adapter 120. As depicted, network adapter 120 communicates with the other components of computer system/server 112 via bus 118. It should be understood that although not shown, other hardware and/or software components could be used in conjunction with computer system/server 112. Examples, include, but are not limited to: microcode, device drivers, tape drives, RAID systems, redundant processing units, data archival storage systems, external disk drive arrays, etc.

Figure 2:
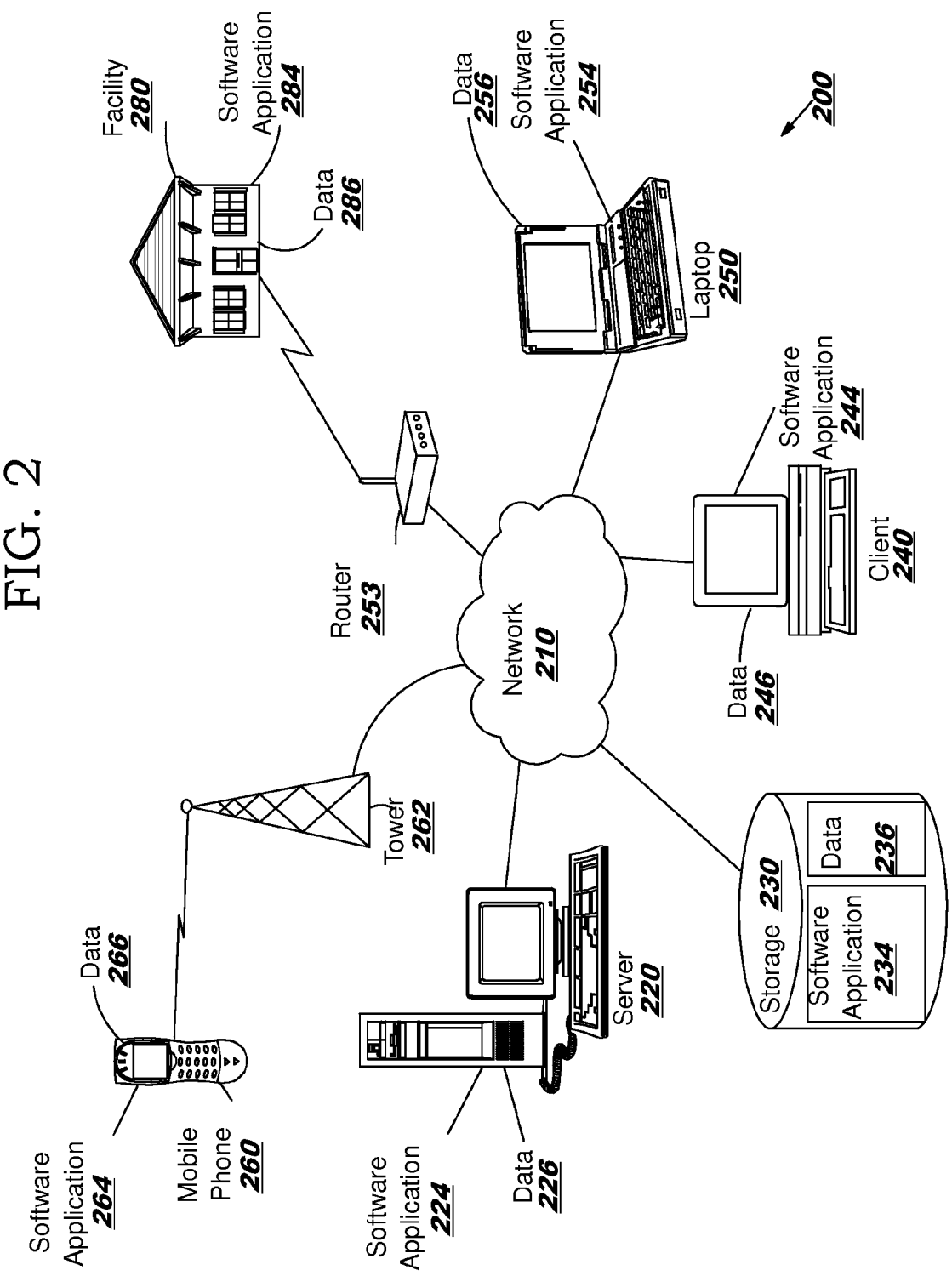
FIG. 2 is a block diagram of a network of data processing systems in which various embodiments may be implemented.

FIG. 2 is a block diagram of a network of data processing systems in which various embodiments may be implemented. Data processing environment 200 is a network of data processing systems such as described above with reference to FIG. 1. Software applications may execute on any computer or other type of data processing system in data processing environment 200. Data processing environment 200 includes network 210. Network 210 is the medium used to provide simplex, half duplex and/or full duplex communications links between various devices and computers connected together within data processing environment 200. Network 210 may include connections such as wire, wireless communication links, or fiber optic cables.

Server 220 and client 240 are coupled to network 210 along with storage unit 230. In addition, laptop 250 and facility 280 (such as a home or business) are coupled to network 210 including wirelessly such as through a network router 253. A mobile phone 260 may be coupled to network 210 through a mobile phone tower 262. Data processing systems, such as server 220, client 240, laptop 250, mobile phone 260 and facility 280 contain data and have software applications including software tools executing thereon. Other types of data processing systems such as personal digital assistants (PDAs), smartphones, tablets and netbooks may be coupled to network 210.

Server 220 may include software application 224 and data 226 for managing displayed content based on a predefined policy or other software applications and data in accordance with embodiments described herein. Storage 230 may contain software application 234 and a content source such as data 236 for managing displayed content based on a predefined policy. Other software and content may be stored on storage 230 for sharing among various computer or other data processing devices. Client 240 may include software application 244 and data 246. Laptop 250 and mobile phone 260 may also include software applications 254 and 264 and data 256 and 266. Facility 280 may include software applications 284 and data 286. Other types of data processing systems coupled to network 210 may also include software applications. Software applications could include a web browser, email, or other software application that can manage displayed content based on a predefined policy.

Server 220, storage unit 230, client 240, laptop 250, mobile phone 260, and facility 280 and other data processing devices may couple to network 210 using wired connections, wireless communication protocols, or other suitable data connectivity. Client 240 may be, for example, a personal computer or a network computer.

In the depicted example, server 220 may provide data, such as boot files, operating system images, and applications to client 240 and laptop 250. Server 220 may be a single computer system or a set of multiple computer systems working together to provide services in a client server environment. Client 240 and laptop 250 may be clients to server 220 in this example. Client 240, laptop 250, mobile phone 260 and facility 280 or some combination thereof, may include their own data, boot files, operating system images, and applications. Data processing environment 200 may include additional servers, clients, and other devices that are not shown.

In the depicted example, data processing environment 200 may be the Internet. Network 210 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 200 also may be implemented as a number of different types of networks, such as for example, an intranet, a local area network (LAN), or a wide area network (WAN). FIG. 2 is intended as an example, and not as an architectural limitation for the different illustrative embodiments.

Among other uses, data processing environment 200 may be used for implementing a client server environment in which the embodiments may be implemented. A client server environment enables software applications and data to be distributed across a network such that an application functions by using the interactivity between a client data processing system and a server data processing system. Data processing environment 200 may also employ a service oriented architecture where interoperable software components distributed across a network may be packaged together as coherent business applications.

Figure 3:
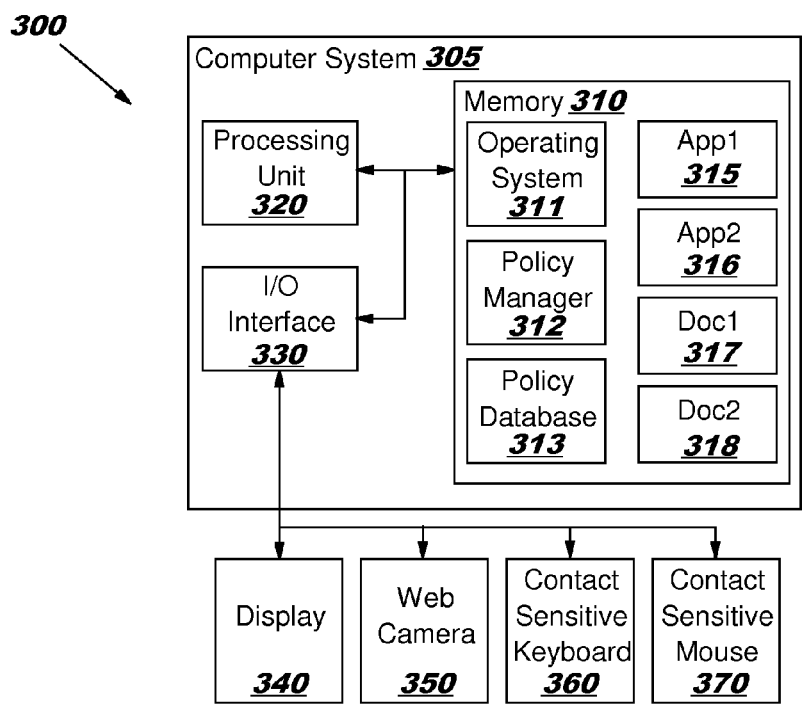
FIG. 3 is a block diagram of a data processing system utilizing a privacy management system in accordance with a first embodiment.

FIG. 3 is a block diagram of a data processing system 300 utilizing a privacy management system in accordance with a first embodiment. Data processing system 300 includes a computer system 305 with a persistent memory 310, a processing unit 320, and an I/O interface 330. I/O interface 330 is in communication with various peripherals including display 340, web camera 350, contact sensitive keyboard 360, and contact sensitive mouse 370. Display 340 is used to display content which may be sensitive. Display 340 may be a cathode ray tube (CRT) display, a liquid crystal display (LCD), a light emitting diode (LED) display, a touch sensitive LCD or LED display, etc. Web camera 350 may detect the presence and physical proximity of a user by motion detection, by body or facial recognition, or by other types of detection, including thermal, depending on the capabilities of the web camera and the software available. Web camera 350 may also be used to determine whether the user is looking at display 340 or not using well known techniques. Web camera 350 may be another type of camera or video capture unit. Contact sensitive keyboard 360 and mouse 370 are able to detect when a user is in contact with that peripheral. This may be detected by a pressure exerted by the weight of the user's hand on the keyboard, mouse or laptop casing. Alternative, such contact may be detected by electro-sensitive sensors that detect the galvanic skin response of a user by utilizing two or more contact points on a mouse, keyboard and/or laptop casing. Other forms of contact detection may be utilized in alternative embodiments. Other peripherals with similar capabilities may also be in communication with computer system 305 through I/O interface 330.

Memory 310 includes an operating system 311, policy manager 312, policy database 313, a first application (App1) 315, a second application (App2) 316, a first document (Doc1) 317, and a second document (Doc2) 318. Policy manager 312 implements privacy policies maintained in policy database 313. Policy manager 312 monitors the various peripherals through operating system 311. Based on the user interactions with those peripherals, such as a user breaking contact with a mouse, keyboard or laptop casing, the policy manager may determine that the user has broken contact through the operating system, determine the appropriate action based on the policy database, and then instruct the operating system to hide, minimize, screen save, password prompt, run a script, run a program, etc. windows displaying certain applications or documents. App1 and App2 are applications that may be protected with a privacy policy depending on previously entered information in policy database 313. In addition, Doc1 and Doc2 may be similarly protected with a privacy policy depending on previously entered information in policy database 313.

FIGS. 4A and 4B are block diagrams of a policy database in accordance with the first embodiment. The policy database may be predefined by a user, administrator, or other authorized person. The policy database has two parts, a policy schedule 400 shown in FIG. 4A and a policy selection 450 shown in FIG. 4B. Alternative embodiments may utilize a single database structure or other types of database structures for all the elements shown in FIGS. 4A and 4B.

Policy schedule includes a mode 410, a rank 415, a first actionable event (Event1) 420, a first policy action (Action1) 425, a second actionable event (Event2) 430, a second policy action (Action2) 435, and a status 440. Mode 410 is an environment where the user is located. This may be determined from the network the user is utilizing for communications. The user may also indicate the mode through a user interface. Rank 415 is the level of sensitivity of a system, application, or document. For example, the system may generally be of low sensitivity, an application such as email may be of high sensitivity, and a certain document may be of medium sensitivity. The application of a sensitivity rank is shown in policy selection 450 below. First actionable event 420 is an identifiable event meeting certain predefined criteria which is used to invoke a policy action. Examples include identifying the removal of user contact with a computer peripheral such as the user breaking contact with the keyboard, mouse or laptop casing, the user looking away from the display as detected by a web camera, etc. Different types of contact breaks may be handled differently. First policy action 425 is the action immediately taken for a given mode and rank when an actionable event occurs. Immediately may not be nearly instantaneously, but a short time period such as less than 3 or 5 seconds. This time period may be adjustable by the user or an administrator. The first policy action may be for hiding sensitive displayed information such as by minimizing a window containing the displayed information, hiding the content by displaying a non-sensitive background and locking the system, screen saving, password prompting, etc.

Second actionable event 430 is an identifiable event meeting certain predefined criteria which is used to undue a prior first policy action. Examples include identifying user contact with a computer peripheral such as the user reestablishing contact with the keyboard, mouse or laptop casing, the user looking back at the display as detected by a web camera, the user manually maximizing a window, the user entering a password, etc. More extensive security measures may be utilized such as biometric measurements of the user's face to verify identity. Second policy action 435 is the action taken for a given mode and rank when a second actionable event occurs. The second policy action may be to display the sensitive information such as by maximizing a window or by replacing the non-sensitive background with the previously displayed sensitive information. Status 440 identifies whether the policy manager is awaiting a first actionable event (clear) to perform a first policy action or whether a first actionable event has occurred (posted) and the policy manager is awaiting a second actionable event to perform a second policy action.

As shown in the example provided in FIG. 4A, for low sensitivity items (e.g., windows) in any mode, the system may be locked after the user has broken contact with a laptop casing (contact break 2). This may also be detected by a web camera or other peripheral. User proximity may be reestablished by the user entering a password. For medium sensitivity windows in the work and home modes, those windows may be temporarily minimized or otherwise hidden when user contact is broken with a peripheral such as a mouse and keyboard, but automatically unhidden when contact is reestablished. For medium sensitivity windows in a public mode, those windows may be minimized or otherwise hidden, but user action is needed (e.g., to click on the window icon) to unhide those windows when contact is reestablished. For high sensitivity windows in a work mode, those windows are minimized or otherwise hidden when user contact is removed, such as the user looks away from the display breaking eye contact as detected by a web camera, but unhidden when the user looks back at the display establishing eye contact. For high sensitivity items in a home or public mode, those windows are minimized when the user looks away from the display and user action is needed to unhide those windows when the user looks back at the display. That user action may be to enter a password or to manually unhide (maximize) the high sensitivity windows. These actions are for illustrative purposes only and many other types of actions may be taken.

Policy selection 450 includes a set of application/document windows or other items for which a sensitivity rank has been selected. Not all items (e.g., software applications, documents, etc.) need have a sensitivity selected for those items, just those items with sensitive content such as confidential information. The first column lists the items 460 identified as containing sensitive content and the second column identifies the sensitivity ranking 470 for those items. In the example provided in this embodiment, the system as a whole is given a low sensitivity ranking, App1 and App2 are given a medium sensitivity ranking, Doc1 is given a high sensitivity ranking, and Doc2 is given a low sensitivity ranking. Each item is then treated according to their sensitivity ranking as described in policy schedule 400. For example, if the user looks away from the display in a work environment, Doc1 will be hidden from view while the other less sensitive documents, applications or other elements continue to be displayed until the user looks back at the display. If Doc1 is being displayed within a window by App1, the high sensitivity of Doc1 will override the medium sensitivity of App1.

Figure 5:
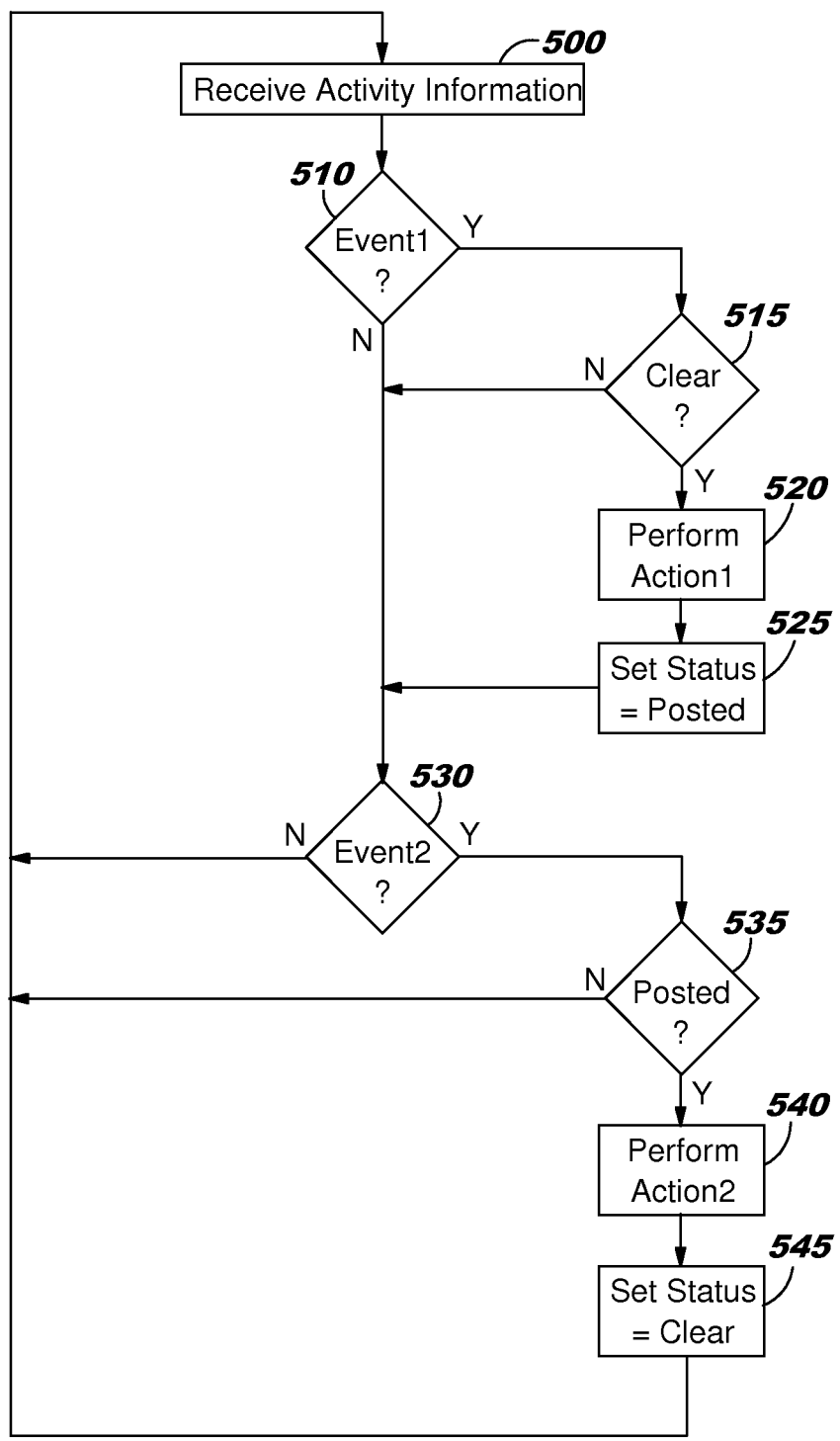
FIG. 5 is a flow diagram of the operation of the policy manager in accordance with the first embodiment.

FIG. 5 is a flow diagram of the operation of the policy manager in accordance with the first embodiment. In a first step 500, the policy manager obtains activity information from the operating system. Such activity can include first actionable events (e.g., user breaks contact, inaction for a period of time) or second actionable events (user looks back at display, user enters password). In a second step 510 the policy manager determines whether a first actionable event (Event1) has occurred meeting the criteria set forth in the predefined policy database. A first actionable event is any event identified in the policy schedule that would invoke a first policy action (Action1). If no first actionable event has occurred, then processing continues to step 530, otherwise processing continues to step 515. In step 515, it is determined whether the status is clear for any event identified in step 510 above. For example with reference to FIG. 4A, if the user has looked away from the display and the status is clear for work high risk, home high risk, or public high risk, then any item marked as high risk may meet this criteria. If yes in step 515, then processing continues to step 520, otherwise processing continues to step 530. In step 520, an Action1 should be performed in response to Event1 for any item which has the matching risk level, mode, and clear status. In example with reference to FIG. 4, if the user has looked away from the display, then any high risk item (Doc1) should have Action1 performed (minimize window) for the given mode with a clear status. Where Action1 is performed, the status should be set to "posted" in step 525. Processing then continues to step 530.

In step 530, it is determined whether a second actionable event (Event2) has occurred meeting the criteria set forth in the predefined policy database. A second actionable event is any event identified in the policy schedule that would invoke a second policy action (Action2). If no second actionable event has occurred, then processing returns to step 500, otherwise processing continues to step 535. In step 535, it is determined whether the status is posted for any event identified in step 530 above. For example with reference to FIG. 4A, if the user has looked back at the display and the status is posted for work high risk, then any item marked as high risk may meet this criteria. If yes in step 535, then processing continues to step 540, otherwise processing returns to step 500. In step 540, an Action2 should be performed in response to Event2 for any item which has the matching risk level, mode, and clear status. In example with reference to FIG. 4, if the user has looked back from the display, then any high risk item (Doc1) should have Action1 performed (minimize window) for the given mode with a posted status. Where Action2 is performed, the status should be reset to "clear" in step 545. Processing then returns to step 500.

Figure 6:
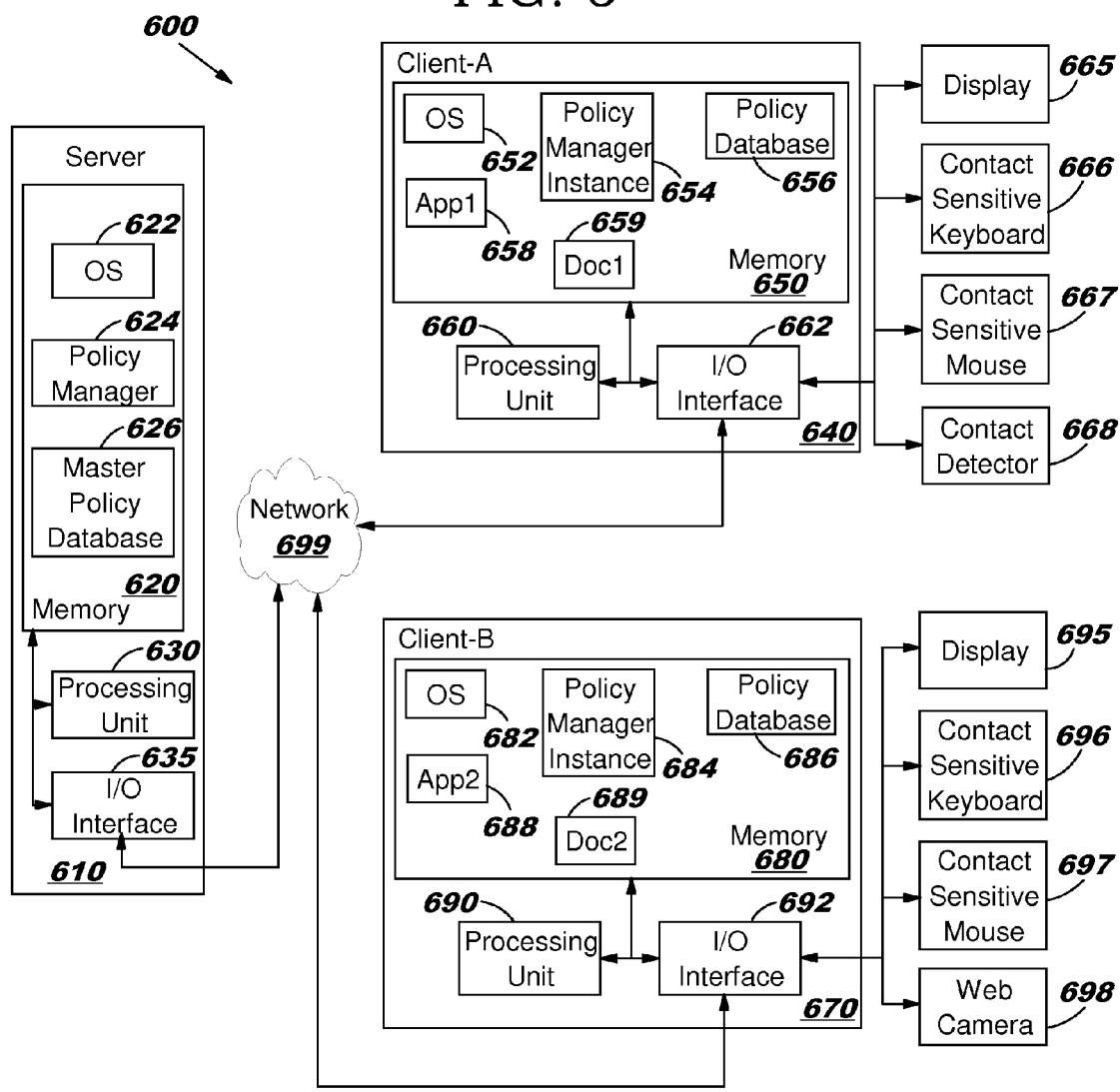
FIG. 6 is a is a block diagram of a server client system 600 utilizing a privacy management system in accordance with a second embodiment.

FIG. 6 is a block diagram of a server client system 600 utilizing a privacy management system in accordance with a second embodiment. Server client system 600 includes a server 610, client system 640 (Client-A) and client system 670 (Client-B) that communicate with each other across a network 699. Network 699 may be an internal network within an enterprise or the internet. Although this is shown as a server client system, it may also be a cloud implementation or other multi-client or multi-user system.

Server 610 includes a persistent memory 620, a processing unit 630, and an I/O interface 635 in communication with each other. I/O interface 635 is also in communication with Client-A and Client-B through network 699. Memory 620 includes an operating system 622, a policy manager 624, and a master policy database 626. Server 610 may also include I/O elements such as a display, keyboard and mouse for an administrator to utilize. However, an administrator may also utilize a client system for that purpose.

Client-A 640 includes a persistent memory 650, a processing unit 660, and an I/O interface 662 in communication with each other. Memory 650 includes an operating system 652 (OS), a policy manager instance 654, a policy database 656, a first application 658 (App1), and a first document 659 (Doc1). Policy manager instance 654 may be an instance of a policy manager 624 that can be updated when the server policy manager is updated. Alternatively, server 610 may not contain a policy manager and each client may contain a separate policy manager that is administered individually. Policy database 656 may be periodically reconciled with the server master policy database 626. The entries in the client policy database may be a subset of relevant entries derived from the master policy database. I/O interface 662 is also in communication with Client-A and Client-B through network 699. Client 640 may also include various peripherals including a display 665, contact sensitive keyboard 666, contact sensitive mouse 667 and contact detector 668. Contact detector may be a weight sensor within a chair, a contact sensor in a flooring material near the system such as under a desk, a thermal sensor, or other type of sensor which can determine whether the user with in contact with the peripheral.

Client-B 670 includes a persistent memory 680, a processing unit 690, and an I/O interface 692 in communication with each other. Memory 680 includes an operating system 682 (OS), a policy manager instance 684, a policy database 686, a second application 688 (App2), and a second document 689 (Doc2). Policy manager instance 684 may be an instance of a policy manager 624 that can be updated when the server policy manager is updated. Alternatively, server 610 may not contain a policy manager and each client may contain a separate policy manager that is administered individually. Policy database 686 may be periodically reconciled with the server master policy database 626. The entries in the client policy database may be a subset of relevant entries derived from the master policy database. I/O interface 692 is also in communication with Client-A and Client-B through network 699. Client 670 may also include various peripherals including a display 695, contact sensitive keyboard 696, contact sensitive mouse 697, and web camera 698.

Displays 665 and 695 are used to display content which may be sensitive. The displays may be a cathode ray tube (CRT) display, a liquid crystal display (LCD), a light emitting diode (LED) display, a touch sensitive LCD or LED display, etc. Web camera 698 may detect the presence of a user by motion detection, by body or facial recognition, or by other types of detection, including thermal, depending on the capabilities of the web camera and the software available. Web camera 698 may also be used to determine whether the user is looking at a display or not using well known techniques. Web camera 698 may be another type of camera or video capture unit. Each contact sensitive keyboard, mouse and laptop casing is able to detect when a user is in contact with that peripheral. This may be detected by a pressure exerted by the weight of the user's hand on the keyboard, mouse or laptop casing. Alternative, such contact may be detected by electrosensitive sensors that detect the galvanic skin response of a user by utilizing two or more contact points on a keyboard, mouse and/or laptop casing. Other forms of contact detection may be utilized in alternative embodiments. Other peripherals with similar capabilities may also be in communication with clients 640 and 670 through I/O interfaces 662 and 692.

Policy manager instances 654 and 684 implement privacy policies maintained in policy databases 656 and 686. Each policy manager instance monitors the various peripherals through an operating system. Based on the user interactions with those peripherals, such as a user breaking contact with a keyboard, mouse or laptop casing, the policy manager may determine that the user has broken contact through the operating system, determine the appropriate action based on the policy database, and then instruct the operating system to hide, minimize, etc. windows displaying certain applications or documents. App1 and App2 are applications that may be protected with a privacy policy depending on previously entered information in the policy databases. In addition, Doc1 and Doc2 may be similarly protected with a privacy policy depending on previously entered information in the policy databases.

FIGS. 7A and 7B are block diagrams of a policy database in accordance with the second embodiment. The policy database may be predefined by a user, administrator, or other authorized person. The policy database has two parts, a policy schedule 700 shown in FIG. 7A and a policy selection 750 shown in FIG. 7B. Alternative embodiments may utilize a single database structure or other types of database structures for all the elements shown in FIGS. 7A and 7B. In this example, no mode is utilized as it is assumed that all clients are in a work environment. Alternative embodiments may utilize multiple modes or other categorizations to further delineate security levels and concerns.

Policy schedule 700 includes a client 710, a rank 715, a first actionable event (Event1) 720, a first policy action (Action1) 725, a second actionable event (Event2) 730, and a second policy action (Action2) 735. No status is stored in the policy schedule, but in the policy selection in this embodiment. Client 710 is the client for each entry. In this example, there are two clients, so there are a set of entries for each client. The entries may be modified by the client and/or by an administrator, depending on the configuration. Because Client1 does not have a web camera, no events or actions for Client1 require a web camera. In a local copy of the policy schedule, only the entries may be downloaded for that client for maintaining security over the preferences. Rank 715 is the level of sensitivity of a system, application, or document. For example, the system may generally be of low sensitivity and an application such as email may be of high sensitivity. Only two levels of sensitivity are shown in this embodiment, but additional levels may be utilized in alternative embodiments. The application of a sensitivity rank is shown in policy selection 750 below. First actionable event 720 is an identifiable event which is used to invoke a policy action. Examples include identifying the removal of user contact with the computer peripheral such as the user breaking contact with the keyboard, mouse and laptop casing, the user looking away from the display as detected by a web camera, etc. Different types of contact breaks may be handled differently. First policy action 725 is the action immediately taken for a given mode and rank when an actionable event occurs. Immediately may not be nearly instantaneously, but a short time period such as less than 3 or 5 seconds. This time period may be adjustable by the user or an administrator. The first policy action may be for hiding sensitive displayed information such as by minimizing a window containing the displayed information or by displaying a non-sensitive background and locking the system.

Second actionable event 730 is an identifiable event which is used to undue a prior first policy action. Examples include identifying user contact with a peripheral such as the user reestablishing contact with the keyboard, mouse or laptop casing, the user looking back at the display as detected by a web camera, the user manually maximizing a window, the user entering a password, etc. Second policy action 735 is the action taken for a given mode and rank when a second actionable event occurs. The second policy action may be to display the sensitive information such as by maximizing a window or by replacing the non-sensitive background with the previously displayed sensitive information. A variety of actions are shown for illustrative purposes only and many other types of actions may be taken.

FIG. 7B is a policy selection 750 for Client 1 in this example. A separate policy selection table may be utilized in Client2. A centralized policy selection table may be utilized in an alternative embodiment. Policy selection 750 includes a set of application/document windows or other items for which a sensitivity rank has been selected. Not all items (e.g., software applications, documents, etc.) need have a sensitivity selected for those items, just those items with sensitive content such as confidential information. The first column lists the items 760 identified as containing sensitive content. The second column identifies the sensitivity ranking 770 for those items. The third column identifies the status 780 of a given item. Status 780 identifies whether the policy manager is awaiting a first actionable event (clear) to perform a first policy action or whether a first actionable event has occurred (posted) and the policy manager is awaiting a second actionable event to perform a second policy action.

In the example provided in this embodiment, the system as a whole is given a low sensitivity ranking, App1 is given a low sensitivity ranking, and Doc1 is given a high sensitivity ranking. Each item is then treated according to their sensitivity ranking as described in policy schedule 400.

Figure 8:
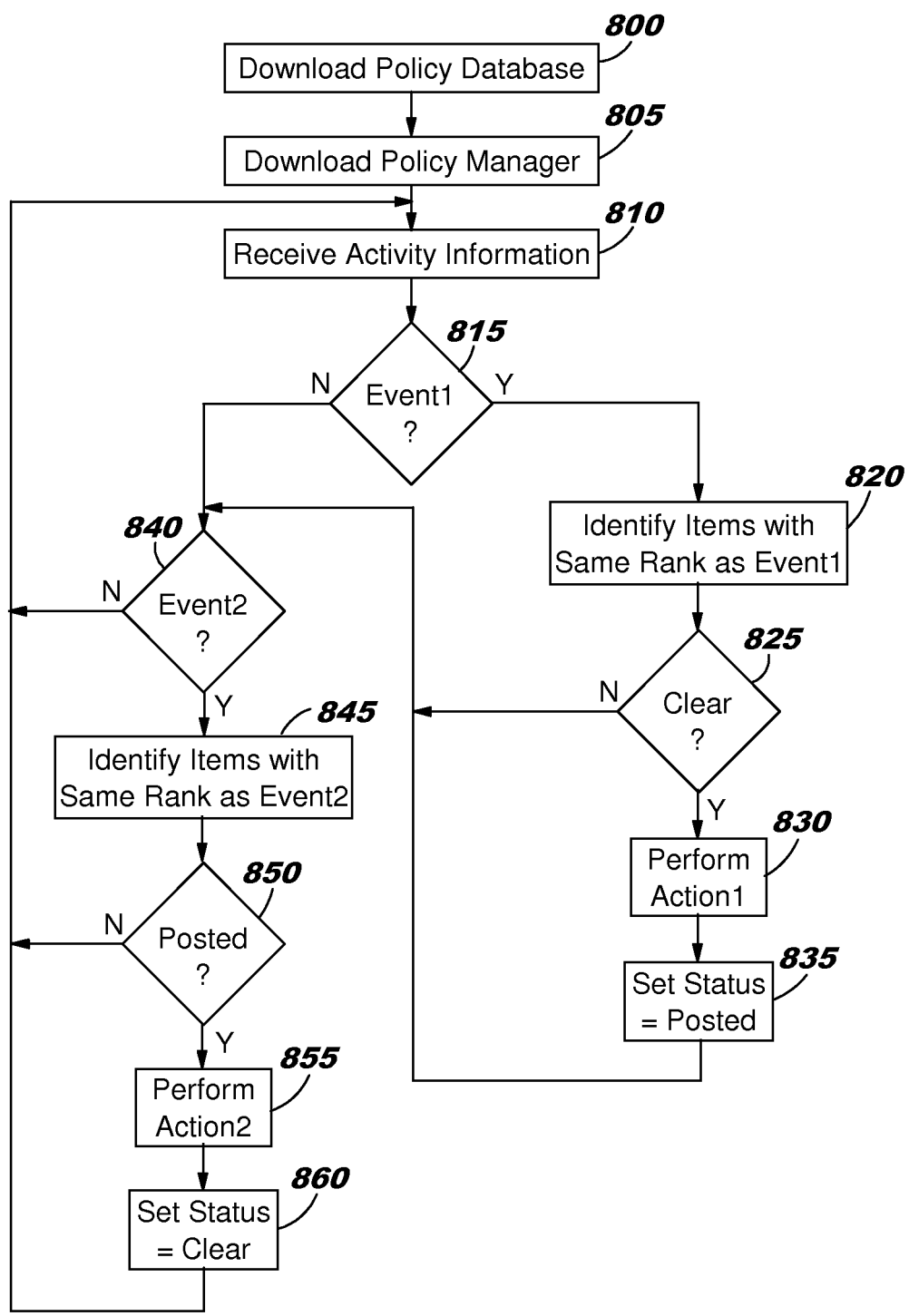
FIG. 8 is a flow diagram of the operation of the policy manager in a first client in accordance with the second embodiment.

FIG. 8 is a flow diagram of the operation of the policy manager in a first client in accordance with the second embodiment. In a first step 800, Client1 downloads the appropriate portions of the policy database. In a second step 805, Client1 downloads and invokes an instance of the policy manager. Alternatively, Client1 may retain a prior copy of the policy database and policy manager and just download updates. In step 810, the policy manager then obtains activity information from the operating system. Such activity can include first actionable events (e.g., user breaks contact, etc.) or second actionable events (user looks back at display, user enters password). Then in step 815 the policy manager determines whether a first actionable event (Event1) has occurred meeting the criteria set forth in the predefined policy database. A first actionable event is any event identified in the policy schedule that would invoke a first policy action (Action1). If no first actionable event has occurred, then processing continues to step 840, otherwise processing continues to step 820. In step 820, any items with the same rank as the event are then identified. In step 825, it is determined whether the status is clear for any item identified in step 820. For example with reference to FIG. 7A, if the user has broken contact with the keyboard, mouse and laptop casing, then the rank is low. The items with a low rank are the system and App1. Since the status of App1 is posted, then only the system would meet this criterion. If yes in step 825, then processing continues to step 830, otherwise processing continues to step 840. In step 830, an Action1 should be performed in response to Event1 for any item which has the matching risk level and clear status, which is the system in this example. For the items where Action1 is performed, the status should be set to "posted" in step 835. Processing then continues to step 840.

In step 840, it is determined whether a second actionable event (Event2) has occurred meeting the criteria set forth in the predefined policy database. A second actionable event is any event identified in the policy schedule that would invoke a second policy action (Action2). If no second actionable event has occurred, then processing returns to step 810, otherwise processing continues to step 845. In step 845, any items with the same rank as the event are then identified. In step 850, it is determined whether the status is posted for any item identified in step 845. For example with reference to FIG. 4A, if the user has reestablished contact with the keyboard, mouse or laptop casing, then any item marked as low risk may meet this criterion. The items with a low rank are the system and App1. Since the status of App1 is posted, then only App1 would meet this criterion. If yes in step 850, then processing continues to step 855, otherwise processing returns to step 810. In step 855, an Action2 should be performed in response to Event2 for any item which has the matching risk level and posted status. Where Action2 is performed, the status should be reset to "clear" in step 860. Processing then returns to step 810.

FIG. 9 is a diagram of a user interface 900 for establishing a policy database entry in which various embodiments may be implemented. A user can use a pull-down menu to select an item 910 and client 920 for which this action applies. Item 910 may be an application, a document, etc. If a user is only available to update the security for a single client, then choice 920 may not be provided. The user is also given a choice 930 to add a new entry, update an existing entry, of delete a prior entry into the policy database. The user can then select a mode 940 and rank 945 for the database entry. Other choices can be made available depending on the system configuration. The user can then select an Event1 950 and a resulting Action1 955. The user also selects an Event2 960 and a resulting Action2 965 to counter the effects of Action1. Once the user has completed this screen, the user can then press an Apply button 970 to perform the desired changes to the policy database.

The invention can take the form of an entirely software embodiment, or an embodiment containing both hardware and software elements. In a preferred embodiment, the invention is implemented in software or program code, which includes but is not limited to firmware, resident software, and microcode.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM), or Flash memory, an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing. Further, a computer storage medium may contain or store a computer-readable program code such that when the computer-readable program code is executed on a computer, the execution of this computer-readable program code causes the computer to transmit another computer-readable program code over a communications link. This communications link may use a medium that is, for example without limitation, physical or wireless.

A data processing system suitable for storing and/or executing program code will include at least one processor coupled directly or indirectly to memory elements through a system bus. The memory elements can include local memory employed during actual execution of the program code, bulk storage media, and cache memories, which provide temporary storage of at least some program code in order to reduce the number of times code must be retrieved from bulk storage media during execution.

A data processing system may act as a server data processing system or a client data processing system. Server and client data processing systems may include data storage media that are computer usable, such as being computer readable. A data storage medium associated with a server data processing system may contain computer usable code such as for managing displayed content based on a predefined policy.

A client data processing system may download that computer usable code, such as for storing on a data storage medium associated with the client data processing system, or for using in the client data processing system. The server data processing system may similarly upload computer usable code from the client data processing system such as a content source. The computer usable code resulting from a computer usable program product embodiment of the illustrative embodiments may be uploaded or downloaded using server and client data processing systems in this manner.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to explain the principles of the invention, the practical application, and to enable others of ordinary skill in the art to understand the invention for various embodiments with various modifications as are suited to the particular use contemplated.

The terminology used herein is for the purpose of describing particular embodiments and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method of automatically hiding sensitive content from a display responsive to removal of user physical proximity from a computer peripheral comprising:
   utilizing a set of predefined policies stored in persistent memory for monitoring user interaction with a computer peripheral for a criterion, wherein the criterion is a removal of user contact with the computer peripheral;
   responsive to detecting the criterion with a processor and identifying an environment where the display is located, determining a corresponding hiding action for each item of displayed sensitive content based on a ranking of each item of sensitive content and the identified environment according to the set of predefined policies;
   performing the determined hiding action corresponding to the each item of displayed sensitive content according to the set of predefined policie; and
   in response to determining that two items of sensitive content sharing a common displayed area have different hiding actions, performing the hiding action corresponding to the item of sensitive content with the highest sensitivity rank for the two items of sensitive content.

2. The method of claim 1 wherein the criterion is the removal of user contact with the computer peripheral selected from a group consisting of detecting the user looking away from the computer peripheral and the user breaking physical contact with the peripheral.

3. The method of claim 2 wherein the criterion is a physical contact to a peripheral selected from a group consisting of a keyboard, a mouse, a laptop casing, and a peripheral.

4. The method of claim 2 wherein the hiding action is performed immediately in response to detecting the criterion.

5. The method of claim 2 wherein the hiding action is selected from a group consisting of hiding, minimizing, screen saving, password prompting, running a script, and running a program to hide the sensitive content.

6. The method of claim 1 further comprising utilizing a predefined policy for monitoring user interaction with a computer peripheral for a second criterion, wherein the second criterion is detecting user contact with the computer peripheral, and responsive to detecting the second criterion subsequent to detecting the first criterion, displaying the sensitive content according to the predefined policy.

7. The method of claim 3 further comprising utilizing a predefined policy for monitoring user interaction with a computer peripheral for a second criterion, wherein the second criterion is detecting user contact with the computer peripheral; and responsive to detecting the second criterion subsequent to detecting the first criterion, displaying the sensitive content according to the predefined policy; wherein the hiding action is performed immediately in response to detecting the criterion;
   wherein the hiding action is selected from a group consisting of hiding, minimizing, screen saving, password prompting, running a script, and running a program to hide the sensitive content.

8. A computer usable program product comprising a computer usable non-transitory storage medium including computer usable code for use in automatically hiding sensitive content from a display responsive to removal of user physical proximity from a computer peripheral, the computer usable program product comprising code for performing the steps of:
   utilizing a set of predefined policies stored in persistent memory for monitoring user interaction with a computer peripheral for a criterion, wherein the criterion is a removal of user contact with the computer peripheral;
   responsive to detecting the criterion with a processor and identifying an environment where the display is located, determining a corresponding hiding action for each item of displayed sensitive content based on a ranking of each item of sensitive content and the identified environment according to the set of predefined policies;
   performing the determined hiding action corresponding to the each item of displayed sensitive content according to the set of predefined policies; and in response to determining that two items of sensitive content sharing a common displayed area have different hiding actions, performing the hiding action corresponding to the item of sensitive content with the highest sensitivity rank for the two items of sensitive content.

9. The computer usable program product of claim 8 wherein the criterion is the removal of user contact with the computer peripheral selected from a group consisting of detecting the user looking away from the computer peripheral and the user breaking physical contact with the peripheral.

10. The computer usable program product of claim 9 wherein the criterion is a physical contact to a peripheral selected from a group consisting of a keyboard, a mouse, a laptop casing, and a peripheral.

11. The computer usable program product of claim 9 wherein the hiding action is performed immediately in response to detecting the criterion.

12. The computer usable program product of claim 9 wherein the hiding action is selected from a group consisting of hiding, minimizing, screen saving, password prompting, running a script, and running a program to hide the sensitive content.

13. The computer usable program product of claim 8 further comprising utilizing a predefined policy for monitoring user interaction with a computer peripheral for a second criterion, wherein the second criterion is detecting user contact with the computer peripheral, and responsive to detecting the second criterion subsequent to detecting the first criterion, displaying the sensitive content according to the predefined policy.

14. A data processing system for automatically hiding sensitive content from a display responsive to removal of user physical proximity from a computer peripheral, the data processing system comprising:
   a processor; and
   a persistent memory storing program instructions which when executed by the processor execute the steps of:
   utilizing a set of predefined policies stored in persistent memory for monitoring user interaction with a computer peripheral for a criterion, wherein the criterion is a removal of user contact with the computer peripheral;
   responsive to detecting the criterion with the processor and identifying an environment where the display is located, determining a corresponding hiding action for each item of displayed sensitive content based on a ranking of each item of sensitive content and the identified environment according to the set of predefined policies;
   performing the determined hiding action corresponding to the each item of displayed sensitive content according to the set of predefined policies; and
   in response to determining that two items of sensitive content sharing a common displayed area have different hiding actions, performing the hiding action corresponding to the item of sensitive content with the highest sensitivity rank.

15. The data processing system of claim 14 wherein the criterion is the removal of user contact with the computer peripheral selected from a group consisting of detecting the user looking away from the computer peripheral and the user breaking physical contact with the peripheral.

16. The data processing system of claim 15 wherein the criterion is a physical contact to a peripheral selected from a group consisting of a keyboard, a mouse, a laptop casing, and a peripheral.

17. The data processing system of claim 15 wherein the hiding action is performed immediately in response to detecting the criterion.

18. The data processing system of claim 15 wherein the hiding action is selected from a group consisting of hiding, minimizing, screen saving, password prompting, running a script, and running a program to hide the sensitive content.

19. The data processing system of claim 14 further comprising utilizing a predefined policy for monitoring user interaction with a computer peripheral for a second criterion, wherein the second criterion is detecting user contact with the computer peripheral, and responsive to detecting the second criterion subsequent to detecting the first criterion, displaying the sensitive content according to the predefined policy.

* * * * *